J. BOYERS.
Churn.
No. 13,421.
Patented Aug. 14, 1855.
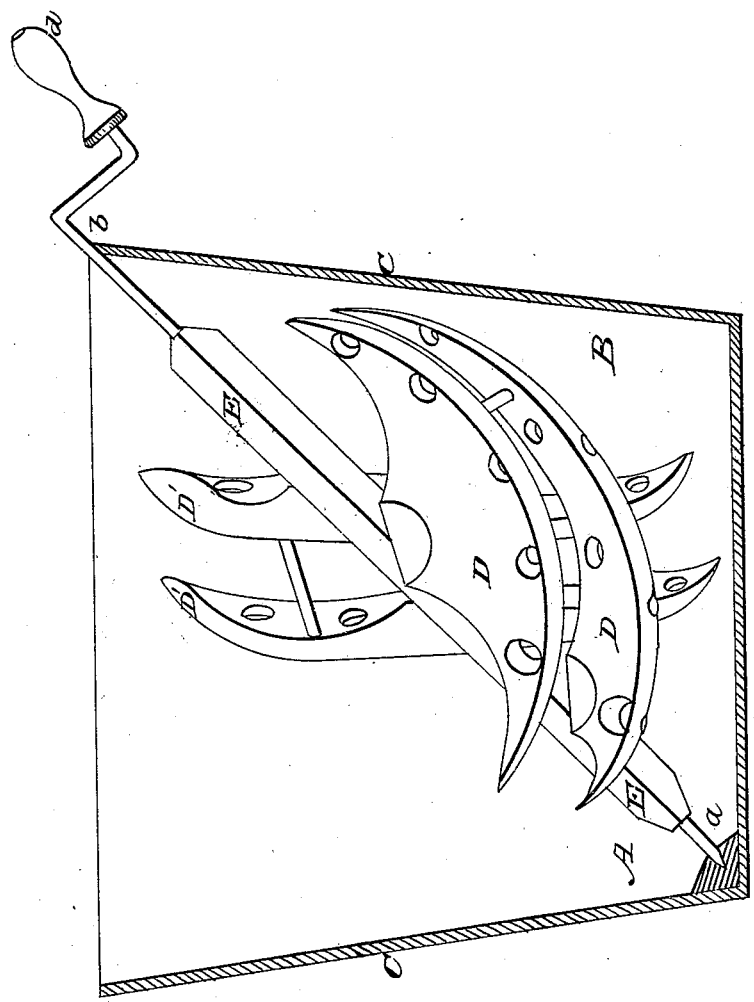

UNITED STATES PATENT OFFICE.

JACOB BOYERS, OF GRANVILLE, VIRGINIA.

CHURN.

Specification of Letters Patent No. 13,421, dated August 14, 1855.

*To all whom it may concern:*

Be it known that I, JACOB BOYERS, of Granville, in the county of Monongahela and State of Virginia, have invented certain new and useful Improvements in Churns; and I do hereby declare that the following is a full, clear, and exact description of the same, reference being had to the accompanying drawings, forming a part of this specification.

The nature of my invention consists, in giving such a direction to the cream, placed in the tub of the churn, by the action of the agitator, that it shall assume the character of a screw, whereby the butter, by an action resembling that of wringing clothes, is separated from the butter milk, in a more solid condition, and gathered in a mass at one side of the churn.

By this improvement the butter is actually worked while forming, and as the milk is more perfectly removed from it, the tendency to become rancid from that cause, is obviated. I furthermore increase the quantity of butter, by the tendency of each particle thereof to coalesce with the others. Its simplicity and economy may be adduced, as well as the convenience for more perfect cleansing and airing than most churns now in use, from the facility in removing the agitator.

The placing the shaft diagonally in the tub, is not from mere caprice; its position enables me to create a vortex, or whirlpool; the lower end of the shaft, viz., at A; while on the opposite side of the tub, viz., at B, the butter is comparatively quiet and suffered to gather in lumps.

E, E, represents the shaft, having one end entering a step $a$, secured at one side of the bottom of a suitable tub C, C, while the upper end drops into a slot or bearing $b$, upon the upper and opposite edge thereof. A suitable handle $d$ serves to rotate the shaft and dashers.

D D D' D' represent dashers secured on the shaft E, E, at an angle thereto, so as to resemble a screw in their position and effect upon the milk; the blades are formed dishing and so placed upon the shaft as to move over, and as near the bottom of the tub as possible, and deliver the uplifted cream at the side at A, in a solid sheet; from this side it flows under the line of the shaft to the side B; lump joining lump as it is twisted by the screw.

The dasher or blades are perforated with holes to render the working of the churn easier.

Having described my improvement, what I claim as my invention and desire to secure by Letters Patent of the United States is—

The shaft E in combination with the dashers D, D, when arranged and combined in the manner and for the purpose substantially as set forth.

In testimony whereof I have hereunto signed my name before two subscribing witnesses.

JACOB BOYERS.

Witnesses:
W. S. CLARK,
JOHN F. CLARK.